United States Patent [19]

Foster

[11] 4,426,780
[45] Jan. 24, 1984

[54] LINE METERING APPARATUS
[75] Inventor: Leslie W. Foster, Wayzata, Minn.
[73] Assignee: The Toro Company, Minneapolis, Minn.
[21] Appl. No.: 298,966
[22] Filed: Sep. 3, 1981
[51] Int. Cl.³ .............................................. B65B 7/00
[52] U.S. Cl. ...................................... 30/276; 30/347; 56/12.7
[58] Field of Search ................... 30/276, 347; 56/12.7, 56/295

[56] References Cited
U.S. PATENT DOCUMENTS
4,245,454  1/1981  Zien .................................. 30/276 X 4,347,666  9/1982  Moore .................................. 30/276

Primary Examiner—E. R. Kazenske
Assistant Examiner—Douglas D. Watts
Attorney, Agent, or Firm—James W. Miller

[57] ABSTRACT

A line metering apparatus (20) for use on a vegetation cutting device (22) includes a driving portion (40) and a driven portion (42). A pivotable pawl (58) selectively couples the driving and driven portions (40) and (42). Whenever the motor (28) is de-energized by turning it off, the driven portion (42) overruns the driving portion (40) causing the pawl (58) to disengage and allow filament line indexing to occur.

2 Claims, 11 Drawing Figures

LINE METERING APPARATUS

FIELD OF THE INVENTION

This invention relates to the field of filament cutting devices and, more particularly, to apparatus for metering a length of flexible filament from a spool member in such a device.

BACKGROUND OF THE INVENTION

Filament cutting devices have generally taken the form of a power source connected or attached to a shaft which holds a whirling or rotating filament holding head or housing. Within the head or housing is at least one flexible filament that extends exteriorly of the housing. The head or housing is rotated at a speed sufficient to create line rigidity. The whirling filament is employed to cut grass or weeds and edge lawns. As a result of normal usage, the flexible filament often becomes worn, frayed or broken. The effective cutting length of the filament is thereby shortened. It is necessary, therefore, to provide within the filament cutting device an apparatus for uncoiling, paying out, or otherwise providing a new length of flexible filament. To avoid overloading the power source and also to conserve flexible filament, it is desirable to have an apparatus which permits the paying out of the filament to predetermined discrete increments only.

Apparatus are known in the prior art for metering a length of flexible filament. Many of the apparatus have metering devices which require the filament cutting devices to be bumped or pressed against the ground or other hard surface. The bumping disengages a first member from a second member thereby allowing a filament guide means to advance relative to a spool having filament thereon resulting in a lengthening of the swinging filament. The first and second members reengage after the axial displacement of the first and second members ceases. The bumping or pressing action, however, is not possible in many areas where filament cutting devices are advantageously useful, for example, on wheeled filament cutting devices or in gardens and other areas where the soil is soft or muddy.

Some filament cutting devices must be stopped in order to disengage first and second members, thereby releasing a filament spool to rotate relative to a filament guide means. With the spool free to rotate, the swinging portion of the filament may be lengthened by manually pulling it from the spool. These manually-operated devices obviously are not very convenient and tend to be quite time-consuming to operate.

Additionally, there are filament cutting devices which utilize the principle of rotational momentum during the deceleration or stopping of the cutting device to advance the spool portion of the device relative to the filament guide means portion. One such device is disclosed in a patent application by Gerald J. Zien entitled "Line Metering Apparatus," filed Feb. 12, 1979, U.S. Pat. No. 4,245,454 and assigned to the assignee of this invention. The line metering device disclosed therein includes a driving mechanism and a driven mechanism. A first set of teeth with ramp elements therebetween is formed on the top of the spool which is preferably coupled directly to the driving mechanism. A second set of teeth for engagement with the first set of teeth is formed on an undersurface of a guide drum which is coupled to the driven means and disposed in an overlying relationship with the filament spool. A bias means forces the second set of teeth on the guide drum into driving engagement with the first set of teeth on the filament spool. A means for rapidly decelerating the driving means is provided. When the driving means is rapidly braked with the decelerating means, the rotational momentum of the guide drum overcomes the bias force holding the first and second sets of teeth in an engaging relationship and allows the second set of teeth to slide up the ramp means thereby rotatingly moving the guide drum relative to the filament spool. The relative rotation of the guide drum and the filament spool results in a lengthening of the swinging portion of the filament. Thus, whenever an additional length of filament is required, the decelerating means is operated to allow the guide drum to rotate relative to the filament spool.

Another device utilizing rotational momentum is disclosed in U.S. Pat. No. 4,138,810. The metering device therein utilizes a flywheel engaged by gear means with filament spools. During deceleration of the filament cutting device, the rotational momentum of the flywheel causes it to overrun the filament spools and drive them by the gear means to rotate relative to the filament guide.

The present invention provides new and different means for metering a length of flexible filament utilizing the rotational momentum of one portion of a mechanism relative to another.

SUMMARY OF THE INVENTION

The present invention is directed to an apparatus for metering discrete lengths of filament in a vegetation cutting device in which the flexible filament is rotatably driven about a substantially vertical axis with a free end of the filament defining a cutting plane. The apparatus includes a driving means for rotatably driving the flexible filament. A driven means is selectively coupled to the driving means for selective rotation therewith. Spool means upon which flexible filament may be wound is coupled to one of said driven and driving means for rotation therewith. Means for metering discrete lengths of filament from the spool means is provided. The metering means includes means for disengaging the driven means from the driving means during a rate of deceleration caused by de-energizing the driving means whereby the driven means is free to rotate a discrete amount relative to the driving means and thereby to pay out a length of filament from the spool means.

In a preferred embodiment, a pivotable pawl is attached to the driving means along an axis perpendicular to a radial line extending from the driving means axis. A filament spool forms a part of the driven means. The pawl is biased into driving engagement with a barrier member attached to the spool. During deceleration, the spool has greater rotational momentum than the driving means. Consequently, the spool overruns the driving means causing an upper portion of the pawl to ride up a ramp and force the lower portion of the pivoting pawl to impact a stop member on the spool. The bias force then pivots the pawl back into its original engaging position. The spool, however, is advanced a discrete distance relative to the driving means. Since a guide drum having a surface for guiding the flexible filament radially outward from the spool is attached to the driving means, the flexible filament is lengthened by the same discrete distance that the spool moves relative to the driving means.

An alternate embodiment operates similarly except the spool is a part of the driving means and the guide drum is a part of the driven means. The pawl is pivotally attached to the spool while the barrier member, ramp, and stop member are parts of the guide drum.

The present invention is particularly advantageous with respect to prior devices in that it eliminates the need for a braking mechanism separate from a stop switch. Furthermore, this is accomplished without the use of a significant weight element, like a flywheel. Consequently, the present invention provides a lighter and simpler metering apparatus than has heretofore been available.

These various advantages and features of novelty which characterize the invention are also pointed out in the claims annexed hereto and forming a part hereof. For a better understanding of the invention, its advantages, and objects obtained by its use, however, reference should be had to the drawings and to the accompanying descriptive matter which form a further part hereof, in which there is illustrated and described preferred embodiments of the invention.

DESCRIPTION OF THE PREFERRED EMBODIMENTS

Figures 1, 2:
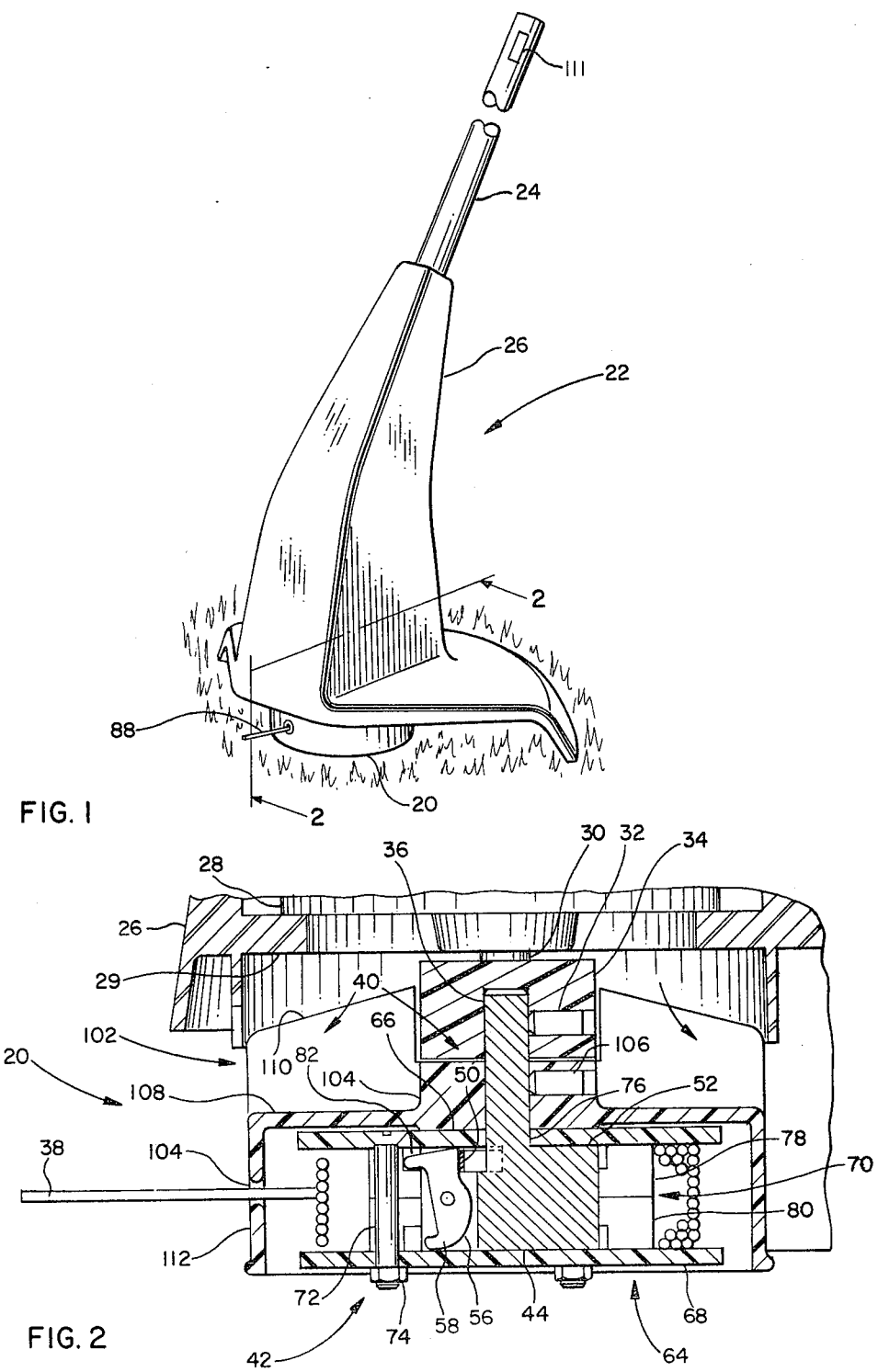
FIG. 1 is a perspective view of a filament cutting device.
FIG. 2 is a partial cross-sectional view, taken along line 2—2 of FIG. 1, illustrating a line metering apparatus in accordance with the present invention.

Referring now to the drawings wherein like reference numerals designate identical or corresponding ports throughout the several views, there is shown in FIG. 2 a line metering apparatus in accordance with the present invention designated generally as 20. The line metering apparatus 20 may be used on a flexible filament vegetation cutting device 22 as illustrated in FIG. 1. It is understood, of course, that line metering apparatus 20 may be used also on other types of cutting devices using flexible filaments, such as those employing a plurality of wheels. The cutting device 22 in FIGS. 1 and 2 includes a shaft 24 and a shroud 26 to which a motor 28 is attached to shroud flange 29 in a conventional way (not shown). Line metering apparatus 20 is attached to the drive shaft 30 of motor 28 by tightening against drive shaft 36 set screw 32 in the coupling end 34 of drive shaft 30. Line metering apparatus 20 is seen in FIG. 1 projecting below shroud 26. Filament 38 extends from the line metering apparatus 20 in a vegetation cutting configuration.

The line metering apparatus 20 in accordance with the present invention is comprised of a driving portion 40 and a driven portion 42. The driven portion 42 is selectively coupled, in a manner to be described hereinafter, to the driving portion 40 for selective rotation therewith.

In the embodiment shown in FIG. 2, the driving portion 40 includes a shaft 36 with an integral hub 44 at the end opposite the end coupled to motor 28. Hub 44 is generally a cylindrical solid piece of material. An off-center slot 46 extends across the upper surface of hub 44 (see FIG. 4). The inner surface 48 of slot 46 is tangent to an imaginary extension of drive shaft 36. Slot 46 has sufficient width and depth to accept leaf spring 50 in an operable fashion such that leaf spring 50 is entirely below the plane of the upper surface 52 of hub 44 (see FIG. 2). Leaf spring 50 is oriented to apply a bias force outwardly and substantially normal to the axis of drive shaft 36. The ends of leaf spring 50 fit within semi-cylindrical slots 54 near the ends of surface 48. Hub 44 also includes a slot 56 centered on a radial plane extending from the axis of drive shaft 36. Slot 56 is located in the wall of hub 44 perpendicularly disposed from slot 46 on the side away from drive shaft 36. Slot 56 has sufficient width and depth to receive pawl 58 as hereinafter described. Portions of hub 44 beneath slot 46 on either side of slot 56 are removed to allow the pivotal attachment of pawl 58 to hub 44 within slot 56 in a conventional manner, such as with a screw 60 and a nut 62. Screw 60 and nut 62 are within the cylindrical envelope of hub 44.

The driving portion 40 of line metering apparatus 20 further includes guide drum 102, to be described hereinafter.

The driven portion 42 of line metering apparatus 20 includes a spool 64. Filament 38 is wrapped thereon in the direction of the rotating drive shaft 36. Spool 64 is comprised of an upper circular plate 66 and a lower circular plate 68 spaced apart by a cylindrical wall 70. Cylinder wall 70 is centered on plates 66 and 68 and fastened in a conventional manner, such as with screws 72 and nuts 74. The upper plate 66 has an axial opening 76 for passage of drive shaft 36. Opening 76 has a diameter slightly larger than the diameter of drive shaft 36 allowing drive shaft 36 to rotate freely within opening 76. Upper and lower plates 66 and 68 extend radially beyond cylindrical wall 70 and define between them a receiving region for filament 38.

As shown in FIG. 2, cylindrical wall 70 is preferably comprised of upper and lower identically-shaped ring members 78 and 80. The upper portion of the inner surface of ring member 78 has a plurality of equiangularly spaced abutment surfaces 82 extending within the ring envelope (see FIG. 4). A smooth arcuate ramp surface 84 extends from the outer edge of one abutment surface 82 to the inner edge of a consecutive abutment surface 82. Abutment surfaces 82 are adjacent upper plate 66 and face in a counter-rotating drive shaft direction. Abutment surfaces 82 function as barrier members against which a dog 92 on pawl 58 may push to drive spool 64 synchronously with drive shaft 38.

Figure 4:
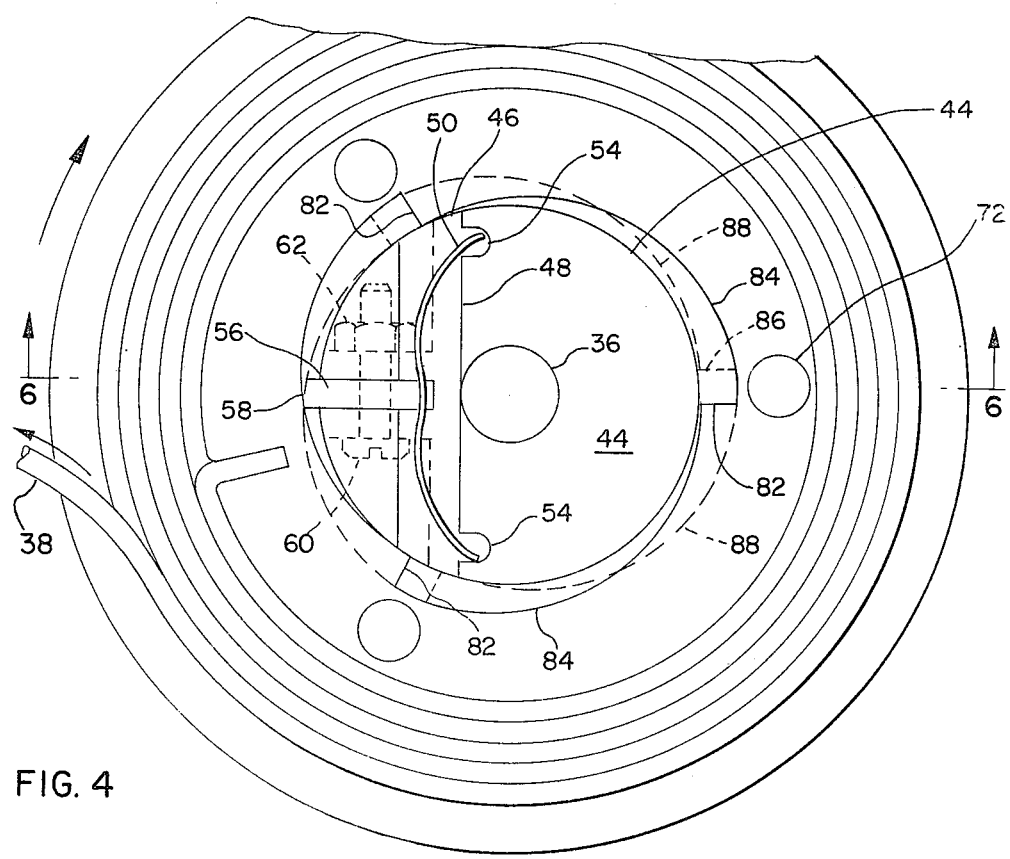
FIG. 4 is a top plan view similar to FIG. 3 showing the pawl between a barrier member and a stop member on the spool means.
Figure 5:
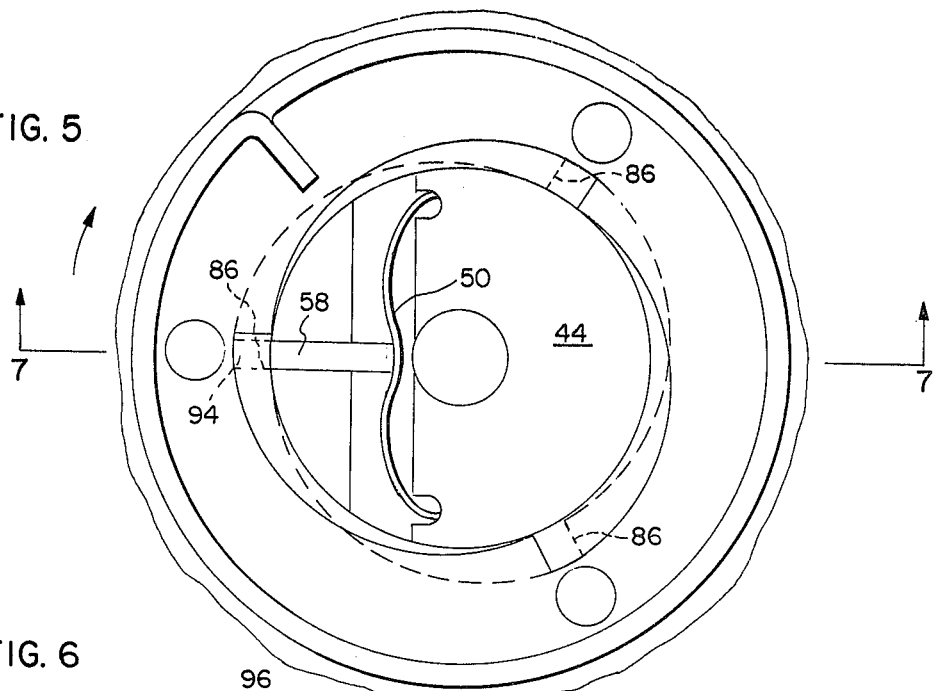
FIG. 5 is a top plan view similar to FIGS. 3 and 4 showing a pawl in engagement with a stop member on the spool means.

In like manner, the lower portion of the inner surface of lower ring member 80 has a plurality of equiangularly spaced abutment surfaces 86 extending within the ring envelope (see FIG. 4). Lower ring member 80 has the same number of abutment surfaces as upper ring member 78. Although not necessary to the function of this embodiment of line metering apparatus 20, a smooth arcuate ramp surface 88, similar to ramp surface 84 in upper ring member 78, extends from the outer edge of one abutment surface 86 to the next consecutive abutment surface 86. Abutment surfaces 86 are adjacent lower plate 68 and face in the rotational direction of drive shaft 36. Abutment surfaces 86 function as stop members against which a dog 94 on pawl 58 may impact to stop the relative rotation of spool 64 and guide drum 102 during deceleration upon motor 28 de-energization.

Figure 6:
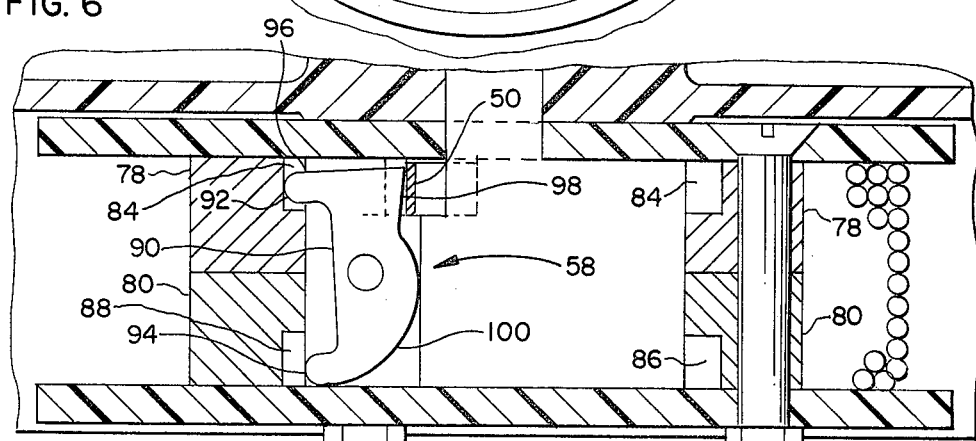
FIG. 6 is a cross-sectional view taken along line 6—6 of FIG. 4.
Figure 7:
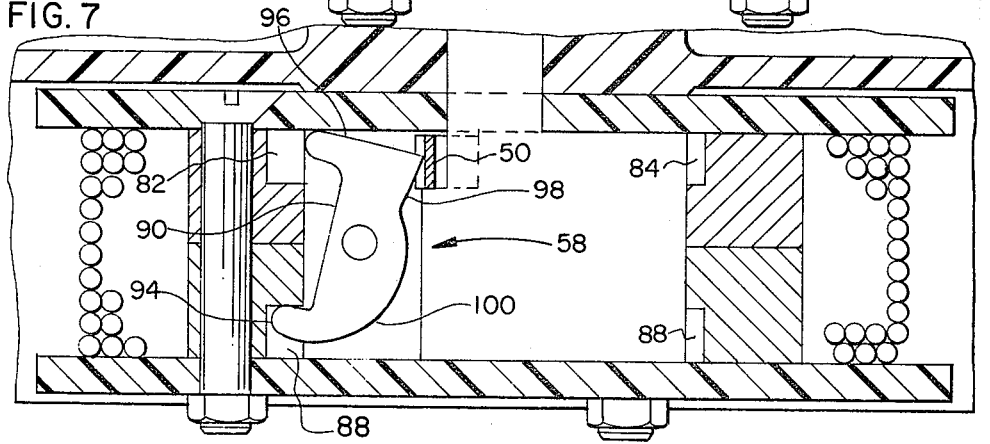
FIG. 7 is a cross-sectional view taken along line 7—7 of FIG. 5.

Pawl 58 and ring members 78 and 80 interact to selectively couple the driven portion 42 and the driving portion 40 of line metering apparatus 20 to one another. Pawl 58 (see FIG. 6) is a flat plate having a straight outer edge 90 parallel to and facing away from the axis of drive shaft 36. Upper and lower dogs 92 and 94, respectively, having straight sides with a semi-circular end are located at the ends of edge 90. Upper edge 96 is substantially straight and perpendicular to outer edge 90. The upper portion 98 of the inside edge forms an acute angle with upper edge 96. When upper dog 92 is in contact with ramp surface 84 and barrier abutment surface 82, the upper portion 98 of the inside edge of pawl 58 is substantially parallel to the sides of leaf spring 50 (see FIG. 2). The lower portion 100 of the inside edge is arcuately shaped to meet the lower edge of lower dog 94.

Dogs 92 and 94 are separated sufficiently to allow dog 92 to contact barrier abutment surface 82, while at another operational time allowing dog 94 to contact stop abutment surface 86. At the same time pawl 58 is sufficiently short in length to avoid contacting either upper plate 66 or lower plate 68 of spool 64. Pawl 58 has sufficient width to provide for its attachment within slot 56 of hub 44. Pawl 58 is pivotally attached along a line substantially normal to its surfaces midway between dogs 92 and 94 and approximately midway between edges 90 and 100. The axis of pawl 58 is substantially normal to a radial line extending from the axis of drive shaft 36. Pawl 58 is attached relative to leaf spring 50 such that leaf spring 50 applies a minimal bias force against edge 98 of pawl 58 when dog 92 is in contact with a ramp surface 84 and a barrier abutment surface 82. Dog 92 extends beyond outer edge 90 such that when it is in contact with ramp surface 84 and barrier abutment surface 82, the rest of pawl 58 is within the cylindrical envelope of hub 44. Similarly, dog 94 extends beyond outer edge 90 such that when it is in contact with ramp surface 88 and stop abutment surface 86, the rest of pawl 58 is within the cylindrical envelope of hub 44.

As shown in FIG. 2, a guide drum 102 is fixedly attached to shaft 36. Guide drum 102 has a central cylindrical hub portion 104 with an axial opening for passage of drive shaft 36. Set screw 106 fastens guide drum 102 to drive shaft 36. A circular plate portion 108 extends radially outward from the lower part of hub portion 104. A plurality of blade members 110 rise above and are integral with plate portion 108. The blade members 110 provide structural strength and function to draw air through motor 28 and blow vegetation clippings outwardly away from line metering apparatus 20. Extending downwardly from the outer edge of plate portion 108 is a cylindrical wall 112. In this fashion, guide drum 102 is disposed in an overlying relationship to spool 64. Opening 114 is located in cylindrical wall 112 approximately centered on spool 64 to provide a bearing surface for supporting and guiding a portion of the free end of filament 38 radially outward from spool 64.

Figure 8:
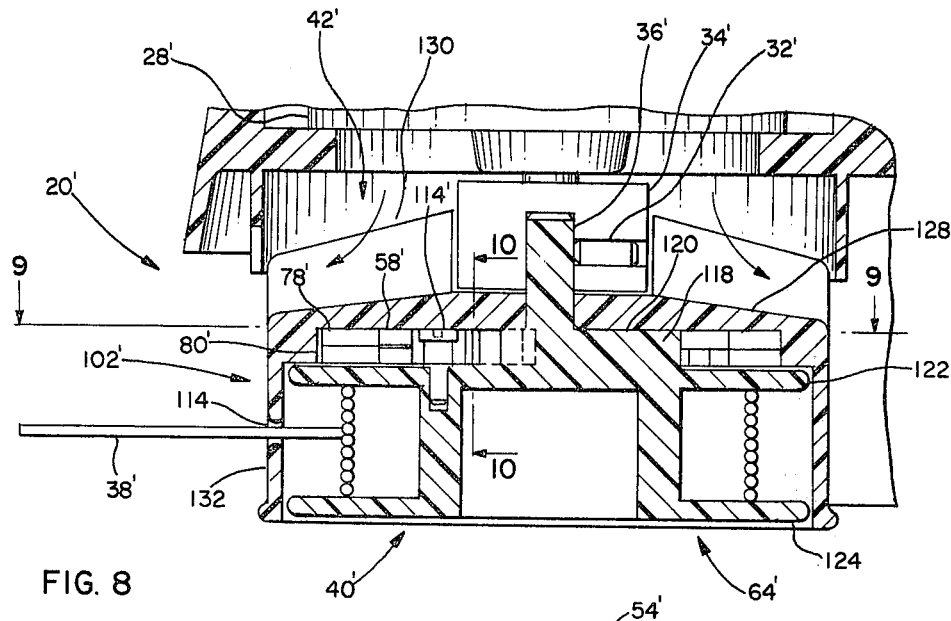
FIG. 8 is a partial cross-sectional view, similar to FIG. 2, illustrating an alternate embodiment of a line metering apparatus in accordance with the present invention.
Figures 10, 11:
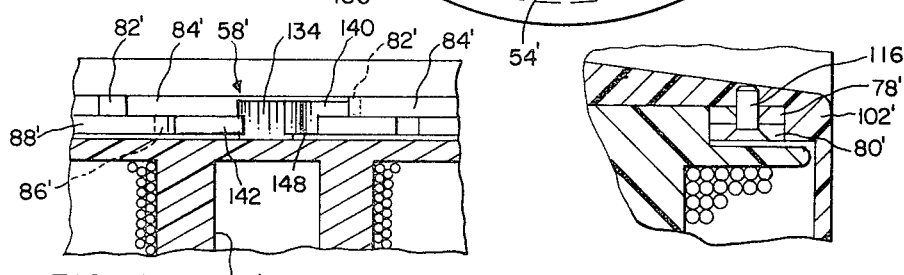
FIG. 10 is a sectional view taken along line 10—10 of FIG. 8.
FIG. 11 is a sectional view taken along line 11—11 of FIG. 9.

A line metering apparatus 20' is shown in FIG. 8. The line metering apparatus 20' has a number of alternate parts which will be identified by new numerals. Parts of line metering apparatus 20' which are similar to line metering apparatus 20 will be indicated by primed numerals. In general, line metering apparatus 20' differs from line metering apparatus 20 in that spool 64' is integral with drive shaft 36', thus forming a part of the driving portion 40' while guide drum 102' is not attached to drive shaft 36, thus forming' a part of the driven portion 42'. Pawl 58' is fastened by screw 114 to spool 64,' to form a part of driving portion 40' similar to line metering apparatus 20. Ring members 78' and 80' having barrier abutment surfaces 82' and stop abutment surfaces 86' are fastened with a plurality of screws 116 (see FIG. 11) to guide drum 102' to form a part of driven portion 42', again similar to line metering apparatus 20.

More particularly, spool 64' is comprised of a cylindrical hub 118 with drive shaft 36' being attached integrally and axially to its top surface 120. A lower portion of hub portion 118 is cyclindrically evacuated leaving a wall of sufficient thickness to provide a threaded opening parallel to the drive shaft axis for screw 114. Upper and lower circular flanges 122 and 124, respectively, extend radially outward from hub portion 118. The region between flanges 122 and 124 defines a receiving region for flexible filament 38'. Filment 38' is wrapped around spool 64' in the rotational direction of drive shaft 36'. The upper surface 120 of hub portion 118 is separated from the upper surface of upper flange 122 by a distance slightly greater than the combined thickness of ring members 78' and 80'. An upper portion of hub portion 118 between the outer cylindrical surface and a chordal surface 126 is cut away. The perpendicular distance between chordal surface 126 and the outer cylindrical surface of hub portion 118 is sufficient to allow pawl 58' and leaf spring 50' to function properly as described hereinafter. The lower surface of the cut away portion lies in the same plane as the upper surface of upper flange 122. There are semi-cyclindrical slots 54' near the ends of chordal surface 126 for retaining the ends of leaf spring 50'.

Guide drum 102' has a circular top portion having an axial opening somewhat greater than the diameter of drive shaft 36' for the through passage of same. A plurality of blade members 130 rise above and are integral with top portion 128. Blade members 130 provide structural strength and function to draw air through motor 28' and blow vegetation clippings outwardly away from line metering apparatus 20'. Extending downwardly from the outer edge of top portion 128 is cyclindrical wall 130. In a fashion similar to that of guide drum 102 in line metering apparatus 20, guide drum 102' is disposed in an overlying relationship to spool 64'. Opening 114' is located in cyclindrical wall 132 and is approximately centered between flanges 122 and 124. Opening 114' functions to support and guide a portion of the free end of filament 38' radially outward from spool 64'.

Guide drum 102' rests on surface 120 of spool 64'. Drive shaft 36' of spool 64' is fastened with set screw 32' in the coupling end 34' of motor 28'.

The under surface of top portion 128 of guide drum 102' is cyclindrically evacuated sufficiently to receive upper ring 78' and lower ring 80'. The inner surface of upper ring member 78' has a plurality of equi-angularly spaced abutment surfaces 82' extending within the ring envelope (see FIG. 9). A smooth arcuate ramp surface 84' extends from the outer edge of one abutment surface 82' to the inner edge of the next closest abutment surface 82'. Abutment surfaces 82' face in a counter-rotating drive shaft direction. Abutment surfaces 82' function as barrier members against which the leading surface of pawl 58' pushes to drive drum 102' synchronously with drive shaft 36'.

Figure 9:
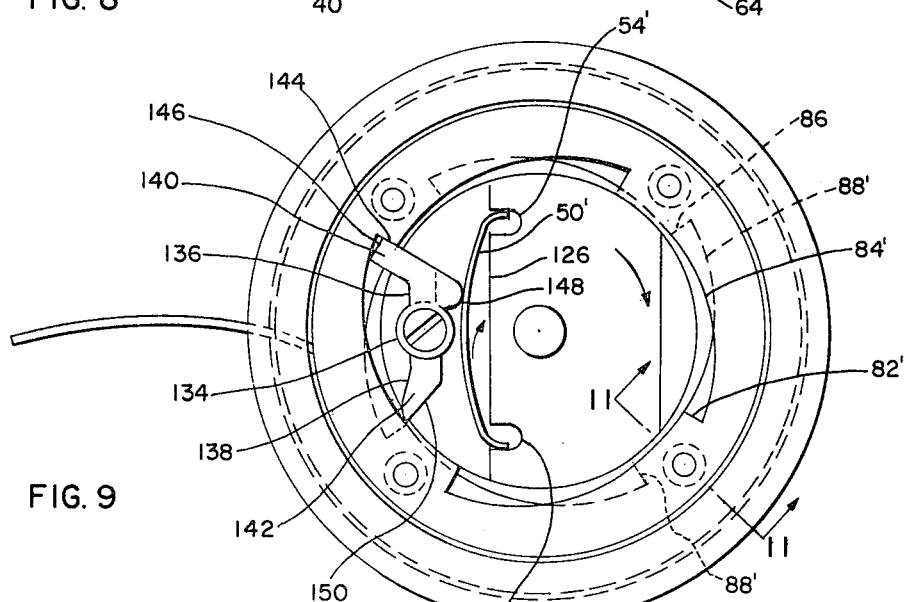
FIG. 9 is a top plan view, taken along line 9—9 of FIG. 8, showing an alternate embodiment of a pawl biased into engagement with a barrier member on a spool means in accordance with the present invention.

The inner surface of lower ring member 80' has a plurality of equiangularly spaced abutment surfaces 86' extending within the ring envelope (see FIG. 9). There are an equal number of abutment surfaces 86' as abutment surfaces 82'. A smooth arcuate ramp surface 88' extends from the outer edge of one abutment surface 86' to the inner edge of the next closest abutment surface 86'. Abutment surfaces 86' face in the rotational direction of drive shaft 36'. Abutment surfaces 86' function as stop members against which the trailing surface 150' of pawl 58' may impact to stop the relative rotation of spool 64' and guide drum 102' during deceleration upon motor 28' de-energization.

As with line metering apparatus 20', pawl 58' and ring members 78' and 80' in line metering apparatus 20' interact to selectively couple the driven portion 42' and the driving portion 40' to one another.

As shown in FIG. 9, pawl 58' has a central portion having an opening for passage of screw 114 to attach pawl 58' to spool 64'. A driving dog 140 and a stopping dog 142 are axially offset (see FIG. 10). Straight connecting portions 136 and 138 project from opposite sides of central portion 134 to connect central portion 134 with driving dog 140 and stopping dog 142, respectively. With connecting portions 136 and 138 aligned approximately parallel with chordal surface 126, driving dog 140 makes an obtuse angle with connecting portion 136. Driving dog 140 may be variously shaped as long as it has a leading surface 144 which is parallel with barrier abutment surface 82' when it is in cntact with the indicated barrier surface 82'. A part of end 146 of driving dog 140 must make contact with ramp surface 84'. A circular projection 148 opposite end 146 of obtusely oriented driving dog 140 makes contact with leaf spring 50' allowing leaf spring 50' to bias driving dog 140 into contact with ramp surface 84'.

Pawl 58' is pivotally attached with screw 114 to spool 64'. The axis of pawl 58' is substantially parallel with the axis of drive shaft 36'. Screw 114 is centered on an axial line extending from the axis of drive shaft 36' and is approximately midway between semi-cyclindrical slots 54' near the ends of cordal surface 126. Screw 114 is spaced away from cordal surface 126 sufficiently so that pawl 58' and leaf spring 50' operate properly.

Stopping dog 142 is substantially an extension of connecting portion 138. The trailing surface 150 of stopping dog 142 is oriented to be parallel with stopping abutment surface 86' when trailing surface 150 is in contact with the stopping abutment surface 86'.

Operation

When the filament cutting device 22 is performing a cutting operation, the motor 28 rotates at a high speed, for example, 8000 rpm. During such a cutting operation, the flexible filament frequently beomes worn, frayed, or broken. When this occurs, the cutting performed by the filament becomes more ragged and less desirable. Consequently, it is advantageous to extend filament 38 a discrete amount after each use thereby allowing the worn portion to be cut by a knife (not shown) attached to the lower portion of shroud 26. Line metering apparatus 20 operates to extend filment 38 each time motor 28 is turned off.

Figure 3:
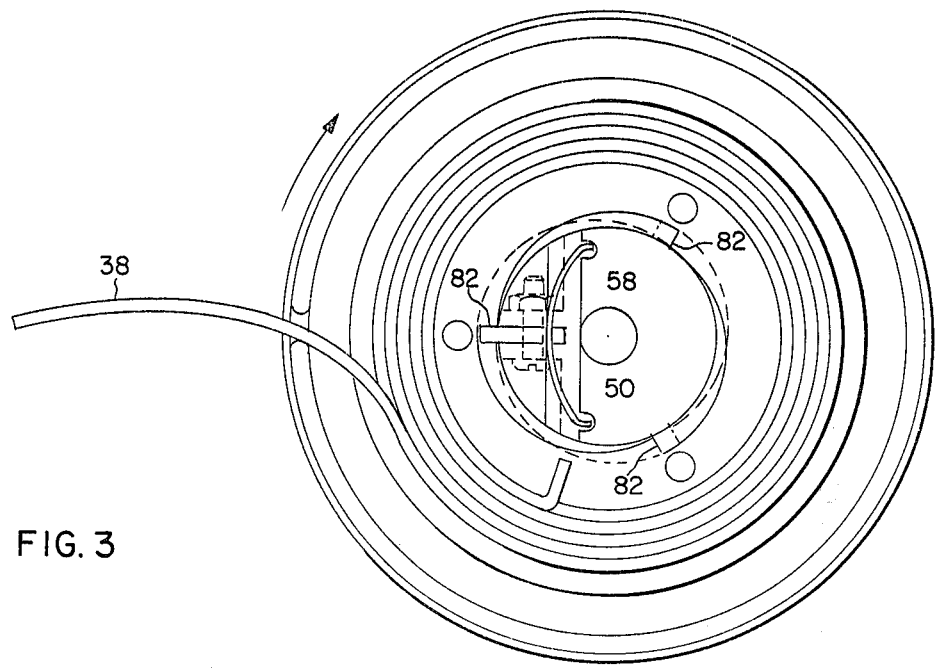
FIG. 3 is a top plan view of a pawl biased into driving engagement with a barrier member on a spool means in accordance with the present invention.

When motor 28 is initially turned on, upper dog 92 of pawl 58 is forced by leaf spring 50 into contact with ramp surface 84. It is to be understood, however, that the bias force of leaf spring 50 is not required since the centrifugal force of rotating pawl 58, having greater weight above its axis than below, will also cause dog 92 into contact with ramp surface 84. As motor 28 begins to rotate dog 92 contacts one of the barrier abutment surfaces 82 to drive spool 64 in synchronous rotation with drive shaft 36 as shown in FIG. 3.

When motor 28 is turned off, pawl 58, as a part of driving portion 40, decelerates to a stop. The greater inertia of spool 64 with filament 38 thereon causes it to decelerate at a slower rate, thereby allowing it to overrun driving portion 40 (see FIG. 4). As this occurs, upper dog 92 rides along ramp surface 84 causing pawl 58 to pivot. As upper dog 92 reaches the end of ramp surface 84, lower dog 94 extends beyond the cyclindrical envelope of hub 44 and hangs there a sufficient time to contact a stop abutment surface 86. Both driving and driven portions 40 and 42 then decelerate together to a stop. At that time leaf spring 50 forces pawl 58 to again pivot, thereby moving dog 94 from contact with a stopping abutment surface 86 and moving upper dog 92 into position to again drivingly engage a barrier abutment surface 82.

The rotation of spool 64 relative to opening 104 in guide drum 102 causes a discrete length of filament 38 to unwind from spool 64.

Line metering apparatus 20' operates in similar fashion except that guide drum 102' overruns spool 64' thereby causing again a discrete length of filament 38' to be unwound from spool 64'.

Line metering apparatus 20 according to this invention has numerous advantages which also apply to apparatus 20. Among these is that line metering apparatus 20 can be used when ground bump type indexers are not appropriate. For example, apparatus 20 could be used on a filament line lawn mower where the filament line cutting head is carried on a wheeled chassis that cannot be raised up and bumped against the ground. Moreover, apparatus 20 could be used on a hand held trimmer assembly and would be particularly effective even when the ground is soft or muddy.

Line metering apparatus 20 operates by turning motor 28 off. This can be accomplished using a suitable switch or control assembly located on the device for manual operation by the person using the vegetation cutting device 22. For example, an on-off switch 111 could be located on the upper end of the handle tube or shaft 24 so as to be easily accessible to an operator who is holding the handle 24. Actuation of switch 111 will turn motor 28 on and off. Other means of de-energizing the motor 28 could also be employed.

While preferred embodiments of the present invention have been described to indicate numerous characteristics and advantages, together with details of structure and function, the novel features of the invention are pointed out in the appended claims. It is to be understood, however, that the disclosure is illustrative only, and that changes may be made in detail, especially in matters in shape, size and arrangement of parts, within the principles of the invention, to the full extend extended by the broad general meaning of the terms in which the appended claims are expressed.

What is claimed is:

1. A vegetation cutting device in which a flexible filament is rotatably driven about a substantially vertical axis with a free end of the filament defining a cutting plane, and the device having a power source with a drive shaft, apparatus for metering discrete lengths of filament comprising:
   (a) driving means coupled to the drive shaft for rotation therewith, wherein the driving means comprises:
      (i) a hub member secured to the drive shaft; and
      (ii) a pawl pivotably mounted on the hub member, wherein the pawl has upper and lower dogs;
   (b) driven means selectively coupled to the driving means, wherein the driven means comprises:
      (i) an upper ring having a plurality of spaced barrier abutment surfaces oriented substantially along radial lines extending from the drive shaft axis and facing in a counter-rotating drive shaft direction, wherein the barrier abutment surfaces are located in the same plane as the upper dog of the pawl such that the upper dog can engage against a barrier abutment surface to rotate the driven means in synchronization with the drive shaft;
      (ii) a lower ring having a plurality of spaced stop abutment surfaces oriented substantially along radial lines extending from the drive shaft axis and facing in the rotational direction of the drive shaft, wherein the stop abutment surfaces are located in the same plane as the lower dog of the pawl such that the lower dog impacts against a stop abutment surface to stop relative rotation between the driven and driving means; and
      (iii) means for pivoting the pawl from a first position in which the upper dog engages a barrier abutment surface to a second position in which the lower dog engages a stop abutment surface, wherein the pivoting means is operative during relative rotation between the driven and driving means;
   (c) spool means upon which the flexible filament is wound, wherein the spool means is secured to the driven means for rotation therewith; and
   (d) means for de-energizing the drive shaft to allow the driven means to rotate relative to the driving means until the lower dog impacts against a stop abutment surface, whereby a discrete increment of filament is payed out from the spool during the relative rotation of the driven means.

2. A vegetation cutting device in which a flexible filament is rotatably driven about a substantially vertical axis with a free end of the filament defining a cutting plane, and the device having a power source with a drive shaft, apparatus for metering discrete lengths of filament comprising:
   (a) driving means coupled to the drive shaft for rotation therewith, wherein the driving means comprises:
      (i) a hub member secured to the drive shaft; and
      (ii) a pawl pivotably mounted on the hub member, wherein the pawl has upper and lower dogs;
   (b) driven means selectively coupled to the driving means, wherein the driven means comprises:
      (i) an upper ring having a plurality of spaced barrier abutment surfaces oriented substantially along radial lines extending from the drive shaft axis and facing in a counter-rotating drive shaft direction, wherein the barrier abutment surfaces are located in the same plane as the upper dog of the pawl such that the upper dog can engage against a barrier abutment surface to rotate the driven means in synchronization with the drive shaft;
      (ii) a lower ring having a plurality of spaced stop abutment surfaces oriented substantially along radial lines extending from the drive shaft axis and facing in the rotational direction of the drive shaft, wherein the stop abutment surfaces are located in the same plane as the lower dog of the pawl such that the lower dog impacts against a stop abutment surface to stop relative rotation between the driven and driving means; and
      (iii) means for pivoting the pawl from a first position in which the upper dog engages a barrier abutment surface to a second position in which the lower dog engages a stop abutment surface, wherein the pivoting means is operative during relative rotation between the driven and driving means;
   (c) spool means upon which the flexible filament is wound, wherein the spool means is secured to the driving means for rotation; and
   (d) means for de-energizing the drive shaft to allow the driven means to rotate relative to the driving means until the lower dog impacts against a stop abutment surface, whereby a discrete increment of filament is payed out from the spool during the relative rotation of the driven means.

* * * * *